Sept. 13, 1938.　　　J. M. BOYKOW　　　2,130,224
NAVIGATIONAL INSTRUMENT
Filed Jan. 22, 1938　　　2 Sheets-Sheet 1

INVENTOR.
JOHANN MARIA BOYKOW DECEASED BY
BIANCA BOYKOW, ERIKA BOYKOW,
AND JOHANN MARIA BOYKOW, SOLE HEIRS
ATTORNEYS

Sept. 13, 1938.   J. M. BOYKOW   2,130,224
NAVIGATIONAL INSTRUMENT
Filed Jan. 22, 1938   2 Sheets-Sheet 2

INVENTOR.
JOHANN MARIA BOYKOW DECEASED BY
BIANCA BOYKOW, ERIKA BOYKOW,
AND JOHANN MARIA BOYKOW, SOLE HEIRS
by Lotka & Kellenbeck
ATTORNEYS Patented Sept. 13, 1938

2,130,224

UNITED STATES PATENT OFFICE 2,130,224

NAVIGATIONAL INSTRUMENT

Johann Maria Boykow, deceased, late of Berlin-Lichterfelde, Germany, by Bianca Boykow, Erika Boykow, and Johann Maria Boykow, Bad Wiessee, Bavaria, Germany, sole heirs, assignors to Deutsche Luftfahrt-und Handels-Aktiengesellschaft, Berlin, Germany, a corporation of Germany Application January 22, 1938, Serial No. 186,361

20 Claims. (Cl. 40—42)

The present invention relates to navigational instruments for indicating the location of a craft equipped therewith and the ground distance traversed by the craft, this application being a continuation in part of the copending application Serial No. 705,997 filed in the United States Patent Office by the said Johann Maria Boykow, deceased, on January 10, 1934.

An object of the present invention is the provision of means for automatically indicating the geographical point at which the craft is located at any particular moment. It is also an object of the invention to provide means for indicating the distance traversed by the craft.

A further object is the provision of means for geometrically adding the integrals of two speed components over time, the geometrical sum of such integrals being a measure of the distance traveled.

The improved apparatus or instrument consists in principle of two members each provided with marks or lines indicating distances either in a linear measure, or in degrees of geographical longitude and latitude, said two members being movable at right angles to each other, with speeds proportional to the ground speed components of the craft in the directions to which the movable members are assigned. A marker permits to distinguish the point of intersection of associated lines, and thus indicates the location of the craft.

The distance traveled by the craft is the known distance of the so established location from the point of departure.

Figure 1:
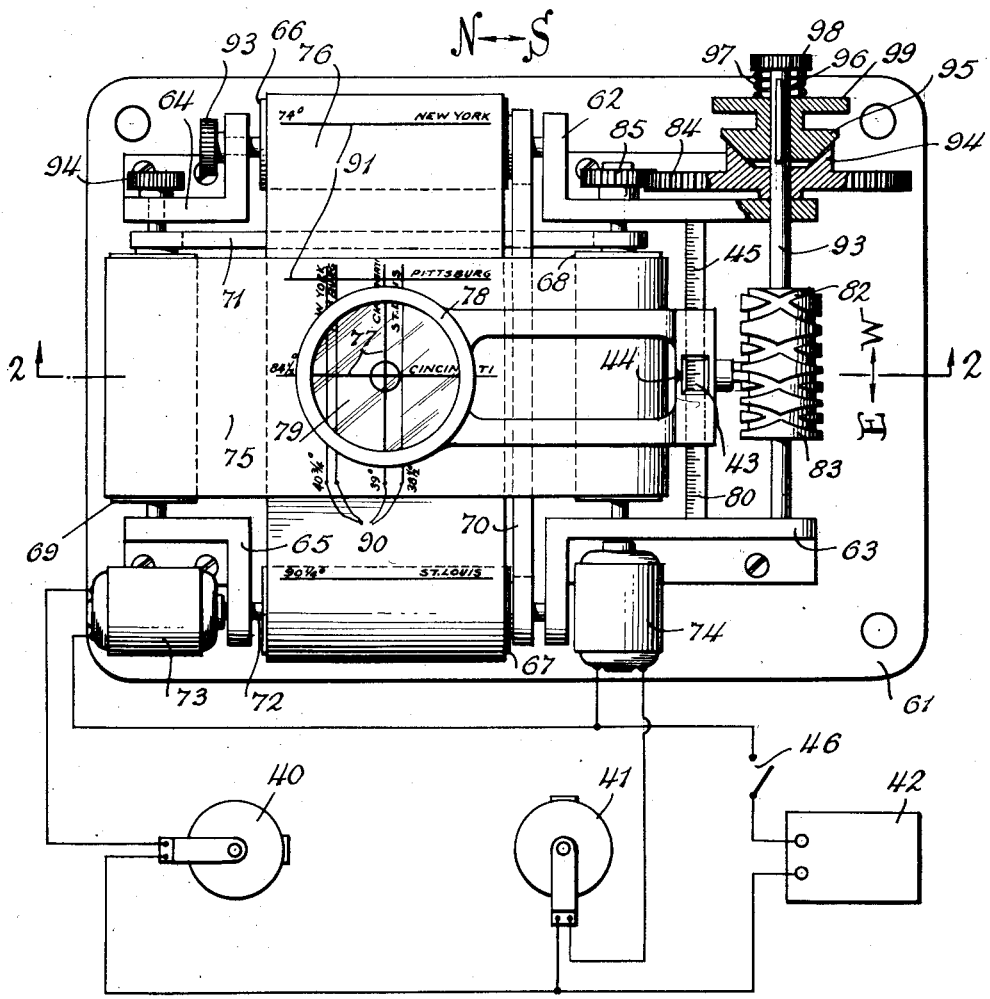
Figure 2:
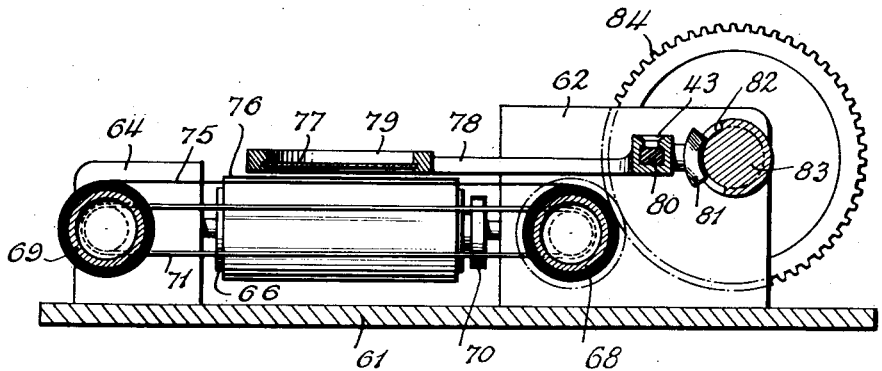
Figure 3:
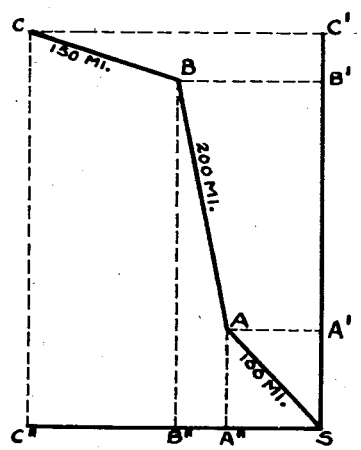
Figure 4:
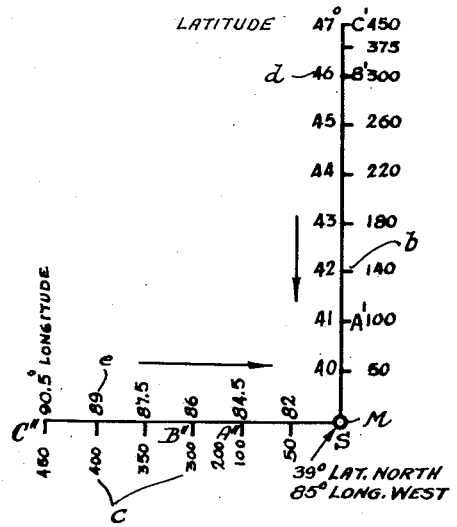

Further objects and details of the invention will be apparent from the description following hereinafter and from the accompanying drawings illustrating an embodiment thereof by way of example. In the said drawings, Fig. 1 is a top plan view of the instrument, partly in section; Fig. 2 is a section of the instrument along line 2—2 of Fig. 1; Figs. 3 and 4 are diagrams indicating the principle according to which distance lines are provided on the movable members.

Said movable members may be of any suitable shape and material provided that they be adapted to be displaced in predetermined directions, one differing from the other one, and that it be possible to establish the point of intersection of associated distance lines. In general, it is advisable to have the said members move at right angles to each other, and in the illustrated and preferred form the directions of these movements correspond to the east-west and to the north-south directions respectively.

In order clearly to point out the principle of the geometrical addition employed in the present invention, reference is had first to Fig. 3 in which line S, A, B, C is the route or path to be traveled by the craft. S is the starting point and SA, AB and BC correspond to the individual parts of the route as to distance and direction from S to A, from A to B, and from B to C respectively. In the example, the distance from S to A is assumed as 100 miles, from A to B as 200 miles, and from B to C as 150 miles. On the coordinate axes SC' and SC'', the points A', B' and A'', B'' are determined so that SA' and SA'' will be the ordinate and abscissa respectively corresponding to the point A. Similarly, A' B' and A'' B'' are the projections, in directions parallel to the coordinate axes, of a line the length of which represents 200 miles and the direction of which is that of AB. In the same manner B' C' and B'' C'' are the projections, in directions parallel to the coordinate axes, of a line the length of which represents 150 miles and the direction of which is that of BC. Hence, points B' and B'' indicate on the coordinate axes the distance of 300 miles from the starting point along the path SAB, and the points C' and C'' the distance of 450 miles from the starting point corresponding to the entire distance from S to C via AB. The partial lengths SA', A' B', B' C', SA'', A'' B'' and B'' C'' may be subdivided so as to indicate every 50 or any other desired number of miles.

Fig. 4 is a diagram with the same coordinate axes SC' and SC'' as in Fig. 3, and with the points A', B', C' and A'', B'', C'' located on said axes at the same respective distances from the origin S as in Fig. 3. Along the ordinate axis SC', Fig. 4 shows a scale of graduation (in miles) b having distance-indicating lines or marks the numbering and spacing of which corresponds to the respective portions of the path SABC. Thus at the point A' we have the graduation mark 100, at the point B' the mark 300 (100+200), and at the point C' the mark 450 (100+200+150). Equal intervals indicate a greater distance (mileage) in the scale portion A' B' than in the scale portion SA', and a still greater distance in the scale portion B' C', this difference being based on the different angles which the path portions SA, AB, and BC respectively form with the same coordinate axis. Similarly, along the abscissa axis SC'', Fig. 4 shows a scale or graduation c having distance-indicating lines or marks. The numbers or other identifying signs appearing adjacent to the scale c correspond to those shown in connection with the scale b; that is to say, the numbers or signs on the scale c are the same at the points A", B", and C" as the numbers or signs on the scale $b$ at the points A', B', and C' respectively, and the proportions of intervals between corresponding graduation marks are likewise the same on both scales $b$ and $c$. In addition to the scales $b$, $c$ representing distance in miles or other units, Fig. 4 shows a latitude scale $d$ along the ordinate axis and a longitude scale $e$ along the abscissa axis, these scales being marked in degrees (and also in minutes or other subdivisions, if desired). In these scales $d$ and $e$, equal intervals correspond to equal differences between the degrees marked on the scales. It will be understood that the diagram Fig. 4 is prepared in accordance with the particular trip or voyage contemplated. Thus, in the particular case illustrated, it has been assumed that the start of the craft's voyage is made at a point located in 39° latitude north and 80½° longitude west, and that the course is to be as indicated in Fig. 3.

Let us now consider a construction in which the scales $b$ and $d$ are on a strip of suitable material, while the scales $c$ and $e$ are on another strip, said strips being movable lengthwise in the directions of the respective coordinate axes. If then such strips are moved simultaneously toward their point of intersection or crossing, as indicated by the arrows, the speed of each strip being proportional to the correspondingly directed component of the ground speed of the craft traveling on the path or route SABC, the scale marks arriving simultaneously at the point of intersection will enable the observer to determine whether the craft is holding the prescribed course and also to determine the true position of the craft and the distance travelled. At M there has been indicated by a circle a normally stationary marker which in the initial position of the scale-bearing strips coincides with the point S of each strip. This marker assists in determining the particular points of the scales which are at the crossing point at each particular moment.

Assuming that the craft is following the prescribed course, this will be indicated to the observer by the fact that points of the scales $b$ and $c$ bearing the same mark will always reach the point of intersection (at the marker M) at the same moment. Under this assumption, therefore, when the point A' of the scale $b$ and the point A" of scale $c$ (both A' and A" being at the mark indicating 100 miles) are simultaneously at the point of intersection (marker M), this will indicate that the craft has arrived at the point A. The craft is therefore at a distance of 100 miles from the starting point S. If in addition there has been continuously a coincidence of similarly marked points of the scales $b$ and $c$ at the point of intersection (M), this indicates that the craft in traveling from S to A has continuously followed the predetermined course from S to A.

If at any time those marks of the scales $b$ and $c$ which are at the point of intersection (M) do not agree, this indicates that the craft has deviated from the prescribed course. In this case, it is still possible to employ the scales $b$ and $c$ for deducing the position of the craft and its distance from the starting point S, but such deduction will require rather inconvenient calculations. The scales $d$ and $e$, however, will even in this case afford a convenient means for the quick determination of the craft's position and its distance from the starting point. Thus, whether or not the craft follows the prescribed course, that mark of scale $d$ which is at the intersection point (M) will indicate the latitude (north) of the craft's position at that moment, while that mark of scale $e$ which is at the intersection point (M) will indicate the longitude (west) of the craft's position at that moment. The (geographical) position of the starting point being known, and the position of the craft at any point of its actual course being indicated by the scales $d$ and $e$, a simple computation will give the distance at which the craft is from the starting point. When, as described above, the scales $d$ and $e$ are marked according to degrees of latitude and longitude respectively (the coordinate axes corresponding to north-south and east-west directions respectively), the computations will be particularly easy in view of the fact that practically all navigational charts employ this system of coordinates.

It will be evident that in order to insure correct indications, the distance scales on the movable members, as well as the transmission rates in the drive of said members, and other factors or coefficients of the instrument will have to be determined correctly by calculation.

While two graduations or scales have been mentioned in connection with each of the coordinate axes SC' and SC", it will be understood that one or the other pair of scales ($b$, $c$ or $d$, $e$) will suffice for obtaining all the data from which the position of the craft and its distance from the starting point may be computed. Each pair of scales has additional advantages of its own, and for this reason it is preferable to use both pairs.

The scales of the pair $d$, $e$ have been described as provided with marks indicating degrees of latitude and longitude respectively. Instead of this, the scales $d$, $e$ might be made with marks indicating distance in miles or other units of length. Thus the scale $d$ might be marked at equal intervals with marks indicating 100, 200, 300 etc. miles, and similar marks might be applied on the scale $e$ at equal intervals. If we assume that the scales $d$ and $e$ indicate movements in the north-south and the east-west directions, as before, then that mile mark on the scale $d$ which is at the intersection point (M) will indicate the number of miles which the craft is at that moment north of the starting point, assuming of course that at the start the zero point of the scale $d$ was at the intersection point (M). Similarly, that mile mark on the scale $d$ which is at the intersection point (M) will indicate the number of miles which the craft is west of the starting point at that moment, assuming again that at the start the zero point of the scale $e$ was at the intersection point.

The principle explained above is employed in the instrument illustrated in Figs. 1 and 2 in which the movable mark-bearing members are strips of paper or other suitable material. Four brackets 62, 63, 64 and 65 are secured to a base plate 61, and two pairs of parallel rollers, reels, or drums 66, 67 and 68, 69 are journaled in these brackets. The axes of drums 66, 67 are arranged at right angles to those of drums 68, 69, and the drums of each pair are operatively connected with each other, for instance by belt drives 70 and 71 respectively. One drum of each set is coupled with an associated driving means to rotate the drum with a speed corresponding to a ground speed component of a craft equipped with the instrument. For this purpose, drum 67 is coupled with an electric motor 73, and drum 68 with an electric motor 74. Any suitable means may be provided to control motor 73 in dependence on the ground speed component to which drums 66 and 67 are assigned, and which, in the example of Figs. 1 and 2 is the east-west direction, and to control motor 74 correspondingly in dependence on the ground speed of the craft in another direction, for example the north-south direction. Such controlling means are schematically indicated as integrators 40 and 41 of the type disclosed in the above-mentioned application Serial No. 705,997. Inasmuch as the details of the integrator are not a part of the present invention, it will suffice to state that such integrator responds to accelerations in a certain direction and is capable of controlling an electric motor connected therewith and with a power source so as to rotate with a speed according to the integral of the accelerations to which the integrator is responsive. In Fig. 1, integrator 40 is so mounted as to respond to east-west accelerations and connected in series with a power source 42 and with motor 73. In a similar manner, integrator 41 is so mounted as to respond to accelerations in the north-south direction and is connected with power source 42 and with motor 74.

One of the above-mentioned strips of flexible material 76 is placed on the drums 66 and 67, and the other strip 75 on the drums 68 and 69. The topmost strip 75 is transparent so that marks on strip 76 are visible through strip 75. The strips are so attached to the respective drums that rotation of the drums will cause lengthwise movement of the strips.

Means are provided for adjusting the strips by turning the drums before the instrument begins to operate. For this purpose, knobs 93 and 94 are secured to the shafts of drums 66 and 69 respectively. It is evident that drums 67 and 68 with motors 73 and 74 will readily follow when drums 66 and 69 are turned through knobs 93 and 94, as long as the motors are not running.

On the strips 75 and 76 the distances to be traversed by the craft from point to point are indicated on strip 75 by transverse lines 90 as differences in geographical longitude, and on strip 76 by transverse lines 91 as differences in geographical latitude. At the pertaining lines the names of the various places (New York etc.) are added. Also, the distances in miles from the starting point may be inscribed as stated above. Such mileage marks have been omitted in Fig. 1 in order to avoid overcrowding. In describing Figs. 3 and 4, the scales on the movable members have been referred to as provided with figures indicating distance or degrees; this however is not essential, and it may be sufficient as an equivalent to mark the names of localities on the strips 75 and 76.

It will be understood that the marking of the strips will differ according to the course contemplated, and whenever a different course is to be followed, strips 75, 76 prepared in accordance therewith will be substituted.

A marker comprising a holder 78 with window 79 and hair line cross 77 is so arranged that the points of intersection of the lines on strips 75, 76 may be observed.

Means are provided for compensating the errors in the indications if the distances are plotted on the strips by rectangular coordinates in form of a Mercator's projection. For this purpose, the holder 78 is formed as a carriage adapted to slide on a bar 80 secured to brackets 62, 63. The slide or holder has an extension or pin 81 extending into a groove 82 of a worm 83 journaled in the brackets 62 and 63. This groove is a double helical groove (with left hand and right hand portions) having an approximately sinusoidal pitch to cause the slide 78 to move in such a manner as to compensate the differences between a Mercator's projection and a spherical one. A gear wheel 84 is mounted on shaft 93 of worm 83 so as to rotate freely thereon. Wheel 84 is in mesh with a pinion 85 secured to the shaft of drum 68, and has an extension 94 forming the female part of a friction clutch. The counterpart 95 of the clutch is splined on the extension 96 of worm shaft 93, and a spring 97 bearing against a collar 98 at the end of shaft extension 96 urges clutch part 95 into engagement with part 94. Integral with part 95 is a projecting rim 99 which may be gripped by an operator. By retracting part 95 and turning it, the slide 78 may be adjusted independently of any adjustment of drum 68. In order to facilitate a correct adjustment, slide 78 may be provided with a window 43 with mark 44 opposite a scale 45 on the bar 80. The scale is graduated in degrees of latitude in accordance with the pitch of worm 83.

The described instrument operates as follows: Before the start of the craft, first slide 78 is adjusted in accordance with the latitude of the place of departure. Then, strips 75 and 76 are so adjusted by turning knobs 93 and 94 that the intersection of the lines for the starting point of the craft for instance "Cincinnati" is just covered by the center of the cross 77, or, if the cross lines 77 are parallel to the lines on the strips, that the cross lines cover the particular two lines 90 and 91 which indicate the starting point. Thereafter, main switch 46 is closed so that current is supplied to the integrator-and-motor circuit. As soon as the craft starts, the integrators 40, 41 will respond to accelerations and accordingly excite motors 73 and 74 respectively. The rotating motors drive the drums and displace strips 75 and 76. Simultaneously, worm 83 is rotated in dependence on the movement of strip 75. Provided the ratios of transmission for the drives of the strip and for the worm, and the scale of the lines on the strips are correctly chosen, the intersection of the lines covered by the cross 77 will constantly indicate the location of the craft and will permit the reading of the traversed distance either directly or by interpolation or by calculation.

Although only one embodiment of the invention has been described and illustrated by way of example, it will be obvious to a person skilled in the art that many modifications and alterations are possible within the scope of the invention as defined in the appended claims. For instance, any other suitable movable members may be used instead of the flexible strips, and means other than the mentioned integrators may be used for controlling the motors driving the flexible strips so as to operate proportionally to ground speed components of the craft.

Where in the appended claims reference is made to "the distance traveled by the craft", this is to be understood as the distance between the starting point and some other point reached by the craft during its journey.

What is claimed as the invention of the said Johann Maria Boykow, is:

1. An instrument for use in the navigation of crafts, comprising two relatively movable indication-bearing members arranged adjacent to each other in such manner that by a relative movement of said members different indications of one member will be brought into registry with indications of the other member at a predetermined marking point, and driving means for effecting relative movement of said members at a rate corresponding to the respective components of the craft's speed in two directions at an angle to each other.

2. An instrument for use in the navigation of crafts, comprising two relatively movable members arranged adjacent to each other and each provided with a series of indications, the series of indications on one member being so arranged relatively to that on the other member that by a relative movement of said members different points of one series will be brought into registry with points of the other series, and driving means for effecting relative movement of said members at a rate corresponding to the respective components of the craft's speed in two directions at an angle to each other.

3. An instrument for use in the navigation of crafts, comprising two relatively movable members arranged adjacent to each other and each provided with a series of indications, the series of indications on one member being arranged in a path which intersects the series on the other member, a marker arranged at the point of such intersection, and driving means for effecting relative movement of said members at a rate corresponding to the respective components of the craft's speed in two directions at an angle to each other.

4. An instrument for use in the navigation of crafts, comprising two relatively movable members arranged adjacent to each other and each provided with a series of indications, the series of indications on one member being arranged in a path which intersects the series on the other member, and driving means for effecting relative movement of said members at a rate corresponding to the respective components of the craft's speed in two directions at an angle to each other.

5. An instrument for use in the navigation of crafts, comprising two members arranged adjacent to each other and relatively movable rectilinearly in two directions at an angle to each other, each of said members being provided with a series of indications, each series extending lengthwise of the direction of relative movement of the respective member, and intersecting the series on the other member, a marker arranged at the point of such intersection, and driving means for effecting relative movement of said members at a rate corresponding to the respective components of the craft's speed in two directions at an angle to each other.

6. An instrument for use in the navigation of crafts, comprising two members arranged adjacent to each other and relatively movable rectilinearly in two directions at an angle to each other, each of said members being provided with a series of indications, each series extending lengthwise of the direction of relative movement of the respective member, and intersecting the series on the other member, and driving means for effecting relative movement of said members at a rate corresponding to the respective components of the craft's speed in two directions at an angle to each other.

7. An instrument for use in the navigation of crafts, comprising two members arranged adjacent to each other and relatively movable rectilinearly in two directions at an angle to each other, each of said members being provided with a series of indications, each series extending lengthwise of the direction of relative movement of the respective member, and intersecting the series on the other member, a normally stationary marker arranged to indicate the point of intersection of said two series, said marker being shiftable in the direction of relative movement of one of said members, and driving means for effecting relative movement of said members at a rate corresponding to the respective components of the craft's speed in two directions at an angle to each other.

8. An instrument for use in the navigation of crafts, comprising two members arranged adjacent to each other and relatively movable rectilinearly in two directions at an angle to each other, each of said members being provided with a series of indications, each series extending lengthwise of the direction of relative movement of the respective member, and intersecting the series on the other member, a normally stationary marker arranged to indicate the point of intersection of said two series, said marker being shiftable in the direction of relative movement of one of said members, an adjusting device for shifting said marker, and driving means for effecting relative movement of said members at a rate corresponding to the respective components of the craft's speed in two directions at an angle to each other.

9. An instrument for indicating the location of a craft and the distance traveled by the craft, comprising two movable strips, at least one of them being of transparent material, said strips being arranged crosswise to each other and being provided with transverse lines indicating distances from a selected point in directions at right angles to each other respectively, the lines of one strip being adapted to intersect those of the other, means for longitudinally moving said strips proportionally to the components of the ground speed of a craft equipped with the instrument, in the respective directions in relation to which said distance lines are provided on said strips, and means for distinguishing, on said strips, points which are in registry with each other at the intersection of the pertaining lines.

10. An instrument for indicating the location of a craft and the distance traveled by the craft, comprising two movable strips, at least one of them being of transparent material, said strips being arranged crosswise to each other and being provided with transverse lines indicating distances of points as to their geographical longitude and latitude respectively, the lines of one strip being adapted to intersect those of the other, means for longitudinally moving said strips proportionally to the components of the ground speed of a craft equipped with the instrument, in east-west and north-south directions respectively, and means for distinguishing, on said strips, points which are in registry with each other at the intersection of the pertaining lines.

11. An instrument for indicating the location of a craft and the distance traveled by the craft, comprising two superposed flexible strips, at least the upper one being of transparent material, said strips being arranged crosswise to each other, and being provided with transverse lines indicating distances from a selected point in directions at right angles to each other respectively, the lines of one strip being adapted to intersect those of the other, two sets of drums arranged at right angles to each other for feeding said flexible strips, means for driving said drums proportionally to the components of the ground speed of the craft equipped with the instrument, in the respective directions in relation to which said distance lines are provided on said strips, and means for distinguishing, on said strips, points which are in registry with each other at the intersection of the pertaining lines.

12. An instrument for indicating the location of a craft and the distance traveled by the craft, comprising two superposed flexible strips, at least the upper one being of transparent material, said strips being arranged crosswise to each other, and being provided with transverse lines indicating distances of points as to their geographical longitude and latitude respectively, the lines of one strip being adapted to intersect those of the other, two sets of drums arranged at right angles to each other for feeding said flexible strips, means for driving said drums proportionally to the components of the ground speed of the craft equipped with the instrument, in east-west and north-south direction respectively, and means for distinguishing, on said strips, points which are in registry with each other at the intersection of the pertaining lines.

13. An instrument for indicating the location of a craft and the distance traveled by the craft, comprising two superposed flexible strips, at least the upper one being of transparent material, said strips being arranged crosswise to each other, and being provided with transverse lines indicating distances of points as to their geographical longitude and latitude respectively, the lines of one strip being adapted to intersect those of the other, two sets of drums arranged at right angles to each other for feeding said flexible strips, means for driving said drums proportionally to the components of the ground speed of the craft equipped with the instrument, in east-west and north-south direction respectively, means for distinguishing, on said strips, points which are in registry with each other at the intersection of the pertaining lines, and means for shifting said distinguishing means lengthwise of the strip provided with distance lines as to the geographical longitude, in accordance with changes in the geographical latitude of the craft's position.

14. An instrument for indicating the location of a craft and the distance traveled by the craft, comprising two superposed flexible strips, at least the upper one being of transparent material, said strips being arranged crosswise to each other, and being provided with transverse lines indicating distances of points as to their geographical longitude and latitude respectively, the lines of one strip being adapted to intersect those of the other, means for distinguishing, on said strips, points which are in registry with each other at the intersection of the pertaining lines, means for shifting said distinguishing means in the longitudinal direction of the strip provided with distance lines as to the geographical longitude, in accordance with changes in the geographical latitude of the craft's position, two sets of drums arranged at right angles to each other for feeding said flexible strips, means for driving the set of drums feeding the strip with distance lines as to the geographical latitude proportionally to the component of the ground speed of the craft equipped with the instrument, in north-south direction, and means for driving said other set of drums and said means for shifting said distinguishing means proportionally to the component of the ground speed of the craft in east-west direction.

15. An instrument for indicating the location of a craft and the distance traveled by the craft, comprising two movable strips, at least one of them being of transparent material, said strips being arranged crosswise to each other and being provided with transverse lines indicating distances of points as to their geographical longitude and latitude respectively, the lines of one strip being adapted to intersect those of the other, means for longitudinally moving said strips proportionally to the components of the ground speed of a craft equipped with the instrument, in east-west and north-south direction respectively, a holder with a marker for the intersection of a pair of said lines and with an engaging member, said holder being movable lengthwise of the strip provided with distance lines as to the geographical longitude, a worm with a thread the pitch of which corresponds to the distortion between a Mercator's projection and a spherical projection, said engaging member of said holder meshing with the worm thread, and means for rotating the worm in dependence on the movements of the strip provided with distance lines as to the geographical latitude.

16. An instrument for indicating the location of a craft and the distance traveled by the craft, comprising two superposed flexible strips, at least the upper one being of transparent material, said strips being arranged crosswise to each other and being provided with transverse lines indicating distances of points as to their geographical longitude and latitude respectively, the lines of one strip being adapted to intersect those of the other, two sets of drums arranged at right angles to each other for feeding said flexible strips, means for driving said drums proportionally to the components of the ground speed of the craft equipped with the instrument, in east-west and north-south direction respectively, means for distinguishing, on said strips, points which are in registry with each other at the intersection of the pertaining lines, means for shifting said distinguishing means lengthwise of the strip provided with distance lines as to the geographical longitude, in accordance with changes in the geographical latitude of the craft's position, and means for adjusting, before the craft begins to move, the strips to the point of departure, so as to bring corresponding lines of the two strips to intersection at said distinguishing means before the craft begins to move.

17. An instrument for indicating the location of a craft and the distance traveled by the craft, comprising two superposed flexible strips, at least the upper one being of transparent material, said strips being arranged crosswise to each other, and being provided with transverse lines indicating distances of points as to their geographical longitude and latitude respectively, the lines of one strip being adapted to intersect those of the other, means for distinguishing, on said strips, points which are in registry with each other at the intersection of the pertaining lines, two sets of drums arranged at right angles to each other for feeding said flexible strips, means for shifting said distinguishing means lengthwise of the strip provided with distance lines as to the geographical longitude, in accordance with changes in the geographical latitude of the craft's position, means for driving the set of drums feeding the strip with distance lines as to the geographical latitude proportionally to the component of the ground speed of the craft equipped with the instrument, in north-south direction, means for driving said other set of drums and said means for shifting said distinguishing means proportionally to the component of the ground speed of the craft in east-west direction, and means for adjusting said distinguishing means independent of said other set of drums.

18. An instrument for indicating the location of a craft and the distance traveled by the craft, comprising two superposed flexible strips, at least the upper one being of transparent material, said strips being arranged crosswise to each other, and being provided with transverse lines indicating distances of points as to their geographical longitude and latitude respectively, the lines of one strip being adapted to intersect those of the other, means for distinguishing, on said strips, points which are in registry with each other at the intersection of the pertaining lines, two sets of drums arranged at right angles to each other for feeding said flexible strips, means for shifting said distinguishing means lengthwise of the strip provided with distance lines as to the geographical longitude, in accordance with changes in the geographical latitude of the craft's position, means for driving the set of drums feeding the strip with distance lines as to the geographical latitude proportionally to the component of the ground speed of the craft equipped with the instrument, in north-south direction, means for driving said other set of drums and said means for shifting said distinguishing means proportionally to the component of the ground speed of the craft in east-west direction, means for adjusing said distinguishing means independent of said other set of drums, and a scale with a latitude graduation along which said distinguishing means may be adjusted.

19. An instrument for indicating the location of a craft equipped with the instrument and the distance traveled by the craft, comprising two integrators responsive to accelerations of the craft in east-west and north-south direction respectively, two electric motors under the control of said integrators so as to rotate with a speed proportional to the components of the ground speed of the craft in east-west and north-south direction respectively, and means for geometrically adding the revolutions of said motors as a measure for the ground distance traversed by the craft as to length and direction.

20. An instrument for indicating the location of a craft equipped with the instrument and the distance traveled by the craft, comprising two integrators responsive to accelerations of the craft in east-west and north-south direction respectively, two electric motors under the control of said integrators so as to rotate with a speed proportional to the components of the ground speed of the craft in east-west and north-south direction respectively, two members movable at right angles to each other, and actuated by said motors respectively, and means for determining the point of intersection of definite lines on the movable members as indicating the location of the craft.

BIANCA BOYKOW,
ERIKA BOYKOW,
JOHANN MARIA BOYKOW,
*Sole Heirs of Johann Maria Boykow, Deceased.*